US012768333B2

(12) United States Patent
Madsen

(10) Patent No.: US 12,768,333 B2

(45) Date of Patent: Oct. 20, 2026

(54) ROTOR BLADE AIRFOIL RACK ARRANGEMENT

(71) Applicant: Siemens Gamesa Renewable Energy A/S, Brande (DK)

(72) Inventor: Jonas Madsen, Tjæreborg (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 279 days.

(21) Appl. No.: 18/688,808

(22) PCT Filed: Jun. 24, 2022

(86) PCT No.: PCT/EP2022/067348

§ 371 (c)(1),
(2) Date: Mar. 4, 2024

(87) PCT Pub. No.: WO2023/030719

PCT Pub. Date: Mar. 9, 2023

(65) Prior Publication Data

US 2024/0376864 A1 Nov. 14, 2024

(30) Foreign Application Priority Data

Sep. 6, 2021 (EP) .................................... 21195032

(51) Int. Cl.
*F03D 13/40* (2016.01)

(52) U.S. Cl.
CPC ........ *F03D 13/401* (2023.08); *F05B 2260/02* (2013.01)

(58) Field of Classification Search
CPC ....... F03D 13/40; F03D 13/401; B63B 77/10; B60P 3/40; B66C 1/108; B65G 1/0442
See application file for complete search history.

(56) References Cited

FOREIGN PATENT DOCUMENTS

| | | | | |
|---|---|---|---|---|
| CN | 102619702 | A | 8/2012 | |
| CN | 110036198 | A | 7/2019 | |
| EP | 2 620 389 | A1 | 7/2013 | |
| EP | 2 699 492 | A1 | 2/2014 | |
| EP | 2 796 709 | A1 | 10/2014 | |
| EP | 3 101 271 | A1 | 12/2016 | |
| WO | WO-2012143014 | A1 * | 10/2012 | ............. F03D 13/40 |

OTHER PUBLICATIONS

International Search Report & Written Opinion for PCT/EP2022/067348 mailed on Sep. 28, 2022.

* cited by examiner

*Primary Examiner* — Huan Le
(74) *Attorney, Agent, or Firm* — Schmeiser Olsen PLLC

(57) ABSTRACT

An airfoil rack arrangement for supporting the airfoils of a plurality of rotor blades is provided, including a number of upright support structures; and a number of airfoil carrier brackets, wherein an airfoil carrier bracket is constructed to extend outward from a support structure. The airfoil rack arrangement includes an airfoil carrier bracket is rotatably mounted to a support structure and configured to rotate between a loading position in which the airfoil carrier bracket is positioned to support the airfoil of a rotor blade, and an unloading position in which the airfoil carrier bracket is out of the path of a rotor blade being lifted vertically.

15 Claims, 9 Drawing Sheets

ROTOR BLADE AIRFOIL RACK ARRANGEMENT

CROSS-REFERENCE TO RELATED APPLICATIONS

This application claims priority to PCT Application No. PCT/EP2022/067348, having a filing date of Jun. 24, 2022, which claims priority to EP Application No. 21195032.4, having a filing date of Sep. 6, 2021, the entire contents both of which are hereby incorporated by reference.

FIELD OF TECHNOLOGY

The following relates to a rotor blade airfoil rack arrangement.

BACKGROUND

To avoid damage to wind turbine rotor blades in the time between manufacturing and installation at the wind turbine site, the rotor blades must be held securely during different transport and storage stages. Multiple rotor blades can be transported by "stacking" them in an array, for example on a marine vessel for transport to an offshore wind farm site. The rotor blades can be held apart by an arrangement of racks, root end fittings and airfoil fittings. In one approach, a rotor blade is held horizontally, i.e., its root end and tip end are essentially in a horizontal line. The root end is secured to a root end rack or frame, and its airfoil is held in a sling. In this approach, the leading-edge points downward, and the trailing edge points upward (or vice versa). For procedural efficiency, the rotor blades are kept in this same orientation for most or all handling stages, including the final installation stage.

One drawback of this known approach is that the airfoil slings must be manually put into place and manually removed. Another drawback of the vertical chord orientation is that lateral wind forces on the large airfoil surface can stress the rotor blade. Particularly during the final installation stage, wind or wind gusts can cause the suspended rotor blade to oscillate erratically, making the installation procedure hazardous and more costly.

SUMMARY

An aspect relates to a more straightforward way of handling wind turbine rotor blades that avoids the problems outlined above.

This aspect is achieved by the claimed rotor blade airfoil rack arrangement, the claimed wind turbine rotor blade storage arrangement and by the claimed method of handling wind turbine rotor blades.

According to embodiments of the invention, the airfoil rack arrangement is constructed to support the airfoils of a plurality of rotor blades. The inventive airfoil rack arrangement comprises a number of upright support structures and a number of airfoil carrier brackets. An airfoil carrier bracket is rotatably mounted at one end to an upright support structure and is constructed to extend essentially horizontally outward from that upright support structure, for example to extend to an adjacent support structure. An airfoil carrier bracket is therefore able to rotate between a loading position in which the airfoil carrier bracket extends horizontally between two support structures to receive the airfoil of a rotor blade, and an unloading position in which the airfoil carrier bracket is out of the path of a rotor blade being raised or lowered through the space alongside an upright support structure.

An advantage of the inventive airfoil rack arrangement is that it allows a safe but quick loading or unloading maneuver, while at the same time ensuring that the rotor blades can be held securely during transport or storage. A further advantage of the inventive airfoil rack arrangement is that a very compact array of rotor blades is possible, since the upright support structures can be arranged at a favorably short distance apart. For example, the space between adjacent upright support structures can be chosen to accommodate the width of the maximum chord of the rotor blade when held "flat", i.e., with its chord plane essentially horizontal.

According to embodiments of the invention, the wind turbine rotor blade storage arrangement comprises such an airfoil rack arrangement for supporting the airfoils of a plurality of rotor blades; and a root end rack arrangement for supporting the root ends of the rotor blades.

According to embodiments of the invention, the method of handling wind turbine rotor blades using such a storage arrangement comprises an initial step of rotating the airfoil carrier brackets to their unloading position, so that the space between the upright support structures, i.e., the space that will later be occupied by rotor blades, is "empty". In embodiments, the method comprises a subsequent step of rotating a lowermost non-loaded airfoil carrier bracket to its "loading" or "receiving" position, i.e., to extend horizontally from one upright support structure to the adjacent upright support structure. In a next step, a wind turbine rotor blade is lowered through the empty space between the upright supports until its airfoil rests on the airfoil carrier bracket. Its root end will be held in a corresponding fixture of the root end rack arrangement. These steps are repeated until the storage arrangement is loaded with wind turbine rotor blades.

The "stack" of rotor blades can be of any size, for example a two-dimensional array. Since wind turbines generally require three rotor blades, the racks of the storage arrangement are configured to receive a multiple of three rotor blades, for example a 3×n stack of rotor blades.

An advantage of the inventive method is that it is favorably quick to load the storage arrangement with the wind turbine rotor blades. The amount of handling is reduced to a minimum, and the number of manual steps can also be reduced or essentially eliminated. For example, in contrast to known procedures, it is not necessary to arrange slings about the airfoil ends, or to suspend such slings from supporting elements of a storage assembly.

Particularly advantageous embodiments and features of the invention are given by the dependent claims, as revealed in the following description. Features of different claim categories may be combined as appropriate to give further embodiments not described herein.

The inventive wind turbine rotor blade storage arrangement can be used during long-term storage, short-term storage, transport, etc. In the following, without restricting embodiments of the invention in any way, the storage arrangement is explained in the context of a transport stage in which wind turbine rotor blades are transported by ship from a port to a remote destination such as a wind farm site. The racks of the inventive wind turbine rotor blade storage arrangement can be permanent fixtures mounted on the upper deck of an installation vessel, for example on the upper deck of a jack-up ship.

The airfoil carrier bracket can be referred to simply as a "bracket" in the following. The unloading position of a bracket can also be referred to as its "open", "empty" or "free" position: the bracket is moved out of the way of an airfoil being raised or lowered through the empty space between upright support structures in a loading or unloading maneuver. The loading position of a bracket can also be referred to as its "receiving" or "closed" position: it can receive a rotor blade airfoil when in its loading position, and any airfoil at a lower level cannot be unloaded until that "closed" bracket is opened again.

In an embodiment of the invention, the unloading position of an airfoil carrier bracket is essentially perpendicular to its loading position, i.e., the bracket rotates through one quarter turn between its open position and its loading position.

The airfoil carrier bracket can be constructed in any suitable manner. In a favorably straightforward realization, the airfoil carrier bracket comprises a rigid beam, for example with a rectangular cross-section. One end of the beam is rotatably mounted to a support structure, for example by a swivel mount or pivot constructed to allow the bracket to swivel in a controlled manner about a point on the support structure. The terms "swivel mount" and "pivot" may be regarded as equivalents. Such a swivel mount is realized to allow the bracket to rotate within a predefined range, for example through one quarter-turn. The swivel mount can be realized in any suitable way, for example using a motor-driven unit, a hydraulically operated unit, a pneumatic unit, a winch-driven system, etc. In an embodiment, the swivel mount or pivot can be actuated using a remote-control interface. Alternatively, a bracket can be turned about its pivot by personnel, for example indirectly by a crane-operated hook that can be attached and detached as required.

In an embodiment, the other end (i.e., the outer end) of the carrier bracket is realized to engage in some way with the adjacent support structure when moved to its loading position to prevent movement of the bracket during transport, for example in stormy conditions or on rough seas. For example, the adjacent upright support structure can be constructed to have a recess into which the free end of a bracket will fit when moved to its loading position. In an alternative to such a passive "parking" mode, an active locking mechanism can be provided between the outer end of a bracket and an upright support structure. For example, a remote-controlled locking mechanism mounted on the outer end of the bracket can engage with the adjacent upright support structure when the bracket is moved to its loading position.

In an embodiment, an arrangement of hydraulically operated swivel mounts or "hydraulic actuators" is provided to move the airfoil carrier brackets to their loading or unloading positions. This can be done most conveniently by a remote-control interface. In an embodiment, the bracket pivots can be controlled individually, in any given sequence.

In an embodiment of the invention, an airfoil carrier bracket is constructed to rotate in an essentially horizontal plane. In an alternative arrangement, a bracket could rotate upwards in an essentially vertical plane, e.g., to the "12 o'clock" position. In this realization, the outer end of the bracket may be realized to lock the bracket in its vertical or "open" position.

In an embodiment of the invention, an airfoil clamp is mounted to an airfoil carrier bracket, for example by bolting or welding to the airfoil clamp to the bracket. The airfoil clamp or "tip clamp" is arranged to fit about the airfoil of a rotor blade that is held with its chord plane in an essentially horizontal orientation. In other words, the rotor blades are held "flat", i.e., the major airfoil surfaces (pressure side and suction side) are "above" and "below". In this orientation, i.e., when the chord plane is in "an essentially horizontal orientation", the leading edge and the trailing edge of the rotor blade define a plane that is essentially horizontal. As the skilled person will be aware, a wind turbine rotor blade may be pre-bent (in the flap-wise direction) or otherwise shaped to optimize its aerodynamic performance and/or to avoid tower collision, so that the chord plane is seldom truly flat and will exhibit some curvature, but in general the chord plane may be regarded as being "essentially horizontal" when the rotor blade is held in this orientation.

In an embodiment, a tip clamp is a two-part device with a lower half shaped to receive one airfoil surface, and an upper half shaped to suit the other airfoil surface. As the skilled person will appreciate, it is necessary to avoid damage to the airfoil surfaces and to any add-ons mounted thereon such as vortex generators, spoilers, slats, flaps, trailing or leading-edge add-ons or other devices that improve the aerodynamic performance of the blade. Therefore, any such tip clamp is generally constructed to protect the airfoil and any add-ons while still securely holding the rotor blade to prevent unwanted movement of the airfoil. In an embodiment of the invention, the closure mechanism of an airfoil clamp comprises an actuator. In an embodiment, any such actuator can be remote-controlled so that personnel need not be present in the inventive wind turbine rotor blade storage arrangement.

In an embodiment of the rotor blade storage arrangement, the root rack is angled outwards in such a way that the root ends are "staggered", i.e., the root end of any higher-level rotor blade is further outward than the root end of the rotor blade at the next lower level. This arrangement is desired, since it helps to avoid collisions between a root end fitting and the root end rack when a rotor blade is being lowered into place or being lifted out. In an embodiment of the invention, the airfoil rack arrangement is constructed at a similar angle, so that the tip clamp about each rotor blade is at the same position relative to the root end.

As indicated above, a long wind turbine rotor blade may be curved or "pre-bent" in the upwind direction so that, when the rotor blade is deformed in the downwind direction during operation of the wind turbine, the risk of a tip/tower collision is reduced or eliminated. The pre-bend angle, which can be a few degrees only, or even in the order of 10°, may be defined quite simply as the angle subtended between a longitudinal axis through the root end of the rotor blade, and a longitudinal axis of the outer end of the airfoil. This pre-bend shape of the rotor blades adds to the complexity of handling maneuvers and storage/transport requirements. In an embodiment of the invention, the "stagger angle" or tilt angle of a rack arrangement is similar to the pre-bend angle of the wind turbine rotor blades, since a tilt angle of several degrees will result in a root end rack with a favorable clearance, making it easier to maneuver a rotor blade to allow its root end fitting to engage with or disengage from the root end rack of the storage rack arrangement.

The loading sequence of the inventive rotor blade storage arrangement has been described above. In an embodiment of the invention, to unload the stack of rotor blades, the inventive method comprises a step of lifting any uppermost wind turbine rotor blade from its airfoil carrier bracket (and root end bracket), and subsequently rotating the now unloaded airfoil bracket to its "open" position. By moving all unloaded airfoil brackets to their "open" positions, free access is given to any rotor blades at the next lower level.

These rotor blades can then be lifted upwards through the empty space between the support structures of the airfoil rack arrangement. These steps are repeated until the wind turbine rotor blades have been removed from the storage arrangement.

Loading/unloading can be done using a single crane. However, loading and/or unloading can be carried out in a safer manner by using two cranes, for example one crane to hold the airfoil end of a rotor blade and another crane to hold the root end. The cranes are controlled in a carefully coordinated manner to maneuver the suspended rotor blade through space. One crane may operate from land, while the other crane may be installed on the deck of a vessel, for example.

BRIEF DESCRIPTION

Some of the embodiments will be described in detail, with references to the following Figures, wherein like designations denote like members, wherein.

Figure 10:
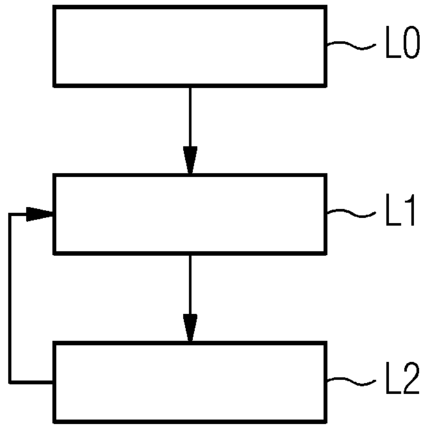
Figure 11:
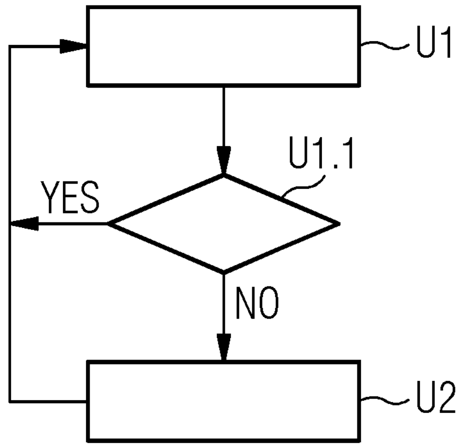

FIG. 10 is a flowchart to illustrate a loading sequence using an embodiment of the inventive storage arrangement in which the airfoil rack arrangement and the root end rack arrangement are constructed to hold a two-dimensional array of wind turbine rotor blades; and FIG. 11 is a flowchart to illustrate an unloading sequence using an embodiment of the inventive storage arrangement in which the airfoil rack arrangement and the root end rack arrangement are constructed to hold a two-dimensional array of wind turbine rotor blades.

DETAILED DESCRIPTION

Figure 1:
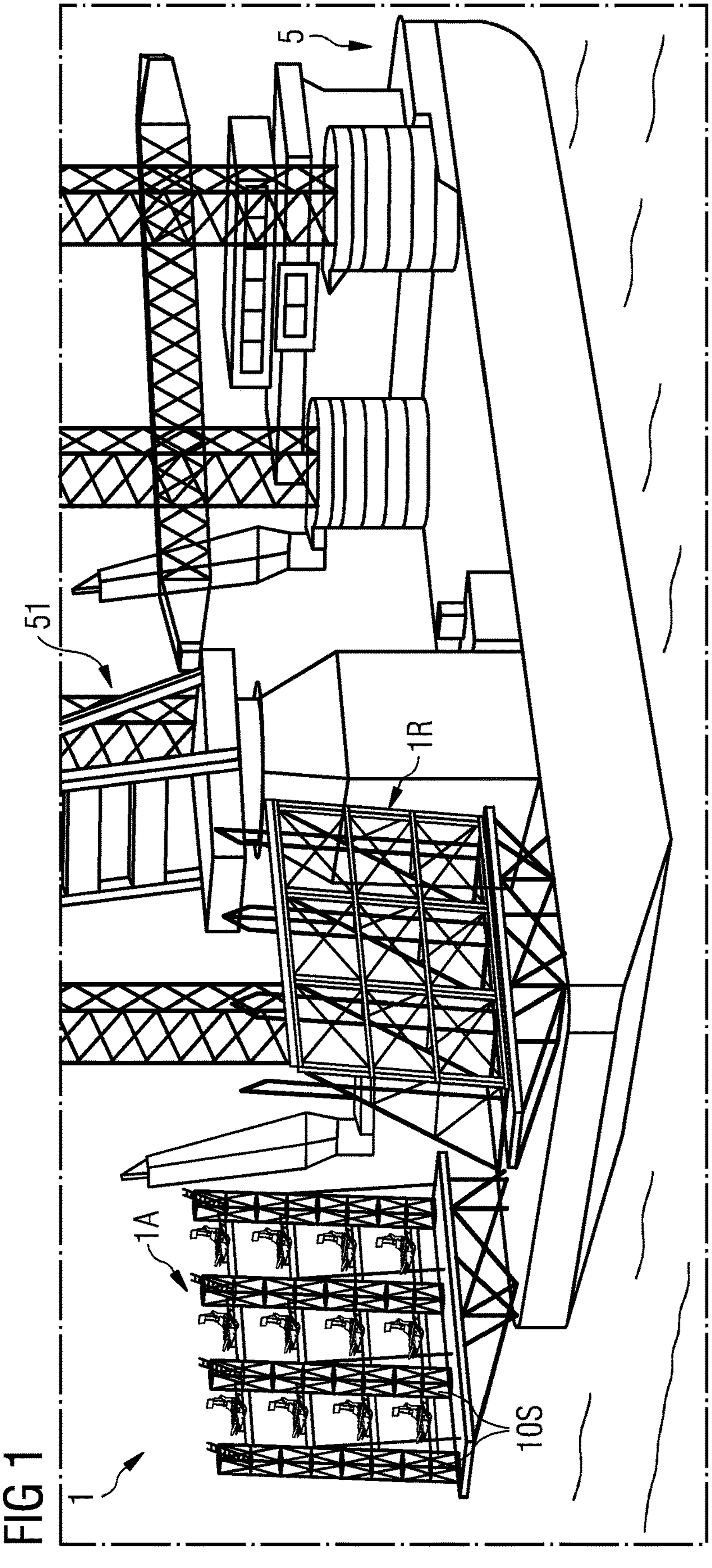
FIG. 1 illustrates loading stages using an embodiment of the inventive wind turbine rotor blade storage arrangement.

FIG. 1 illustrates how racks 1A, 1R of the inventive wind turbine rotor blade storage arrangement 1 might be arranged on board a vessel such as a jack-up installation vessel 5. In this exemplary embodiment, the racks 1A, 1R are positioned so that rotor blades will lie "across" the vessel, i.e., in the port-starboard direction. The diagram also indicates a crane 51 installed on the deck of the jack-up ship 5, for use during loading and unloading operations.

The root end rack 1R can be realized in any suitable manner, for example a supporting framework 1R mounted on the deck of the vessel 5 and constructed to receive a two-dimensional array of root end support fittings. As the skilled person will be aware, a root end support fitting can be mounted to the root end of a rotor blade after the molding procedure is complete, and can remain in place during subsequent finishing, handling, transport and storage procedures until the rotor blade is ready for installation. Further details of the root end rack 1R need not be discussed here.

Figure 2:
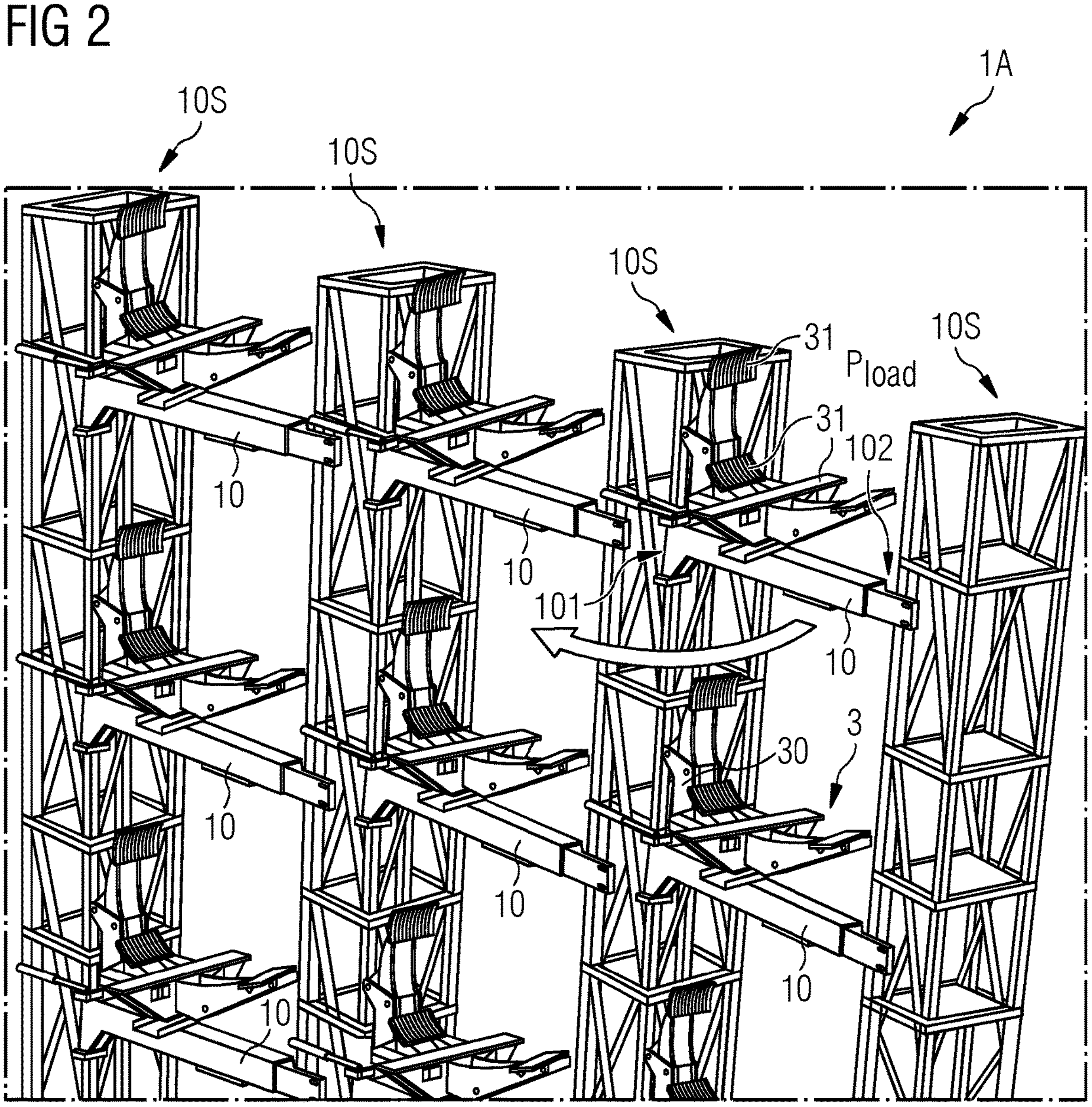
FIG. 2 illustrates loading stages using an embodiment of the inventive wind turbine rotor blade storage arrangement.
Figure 3:
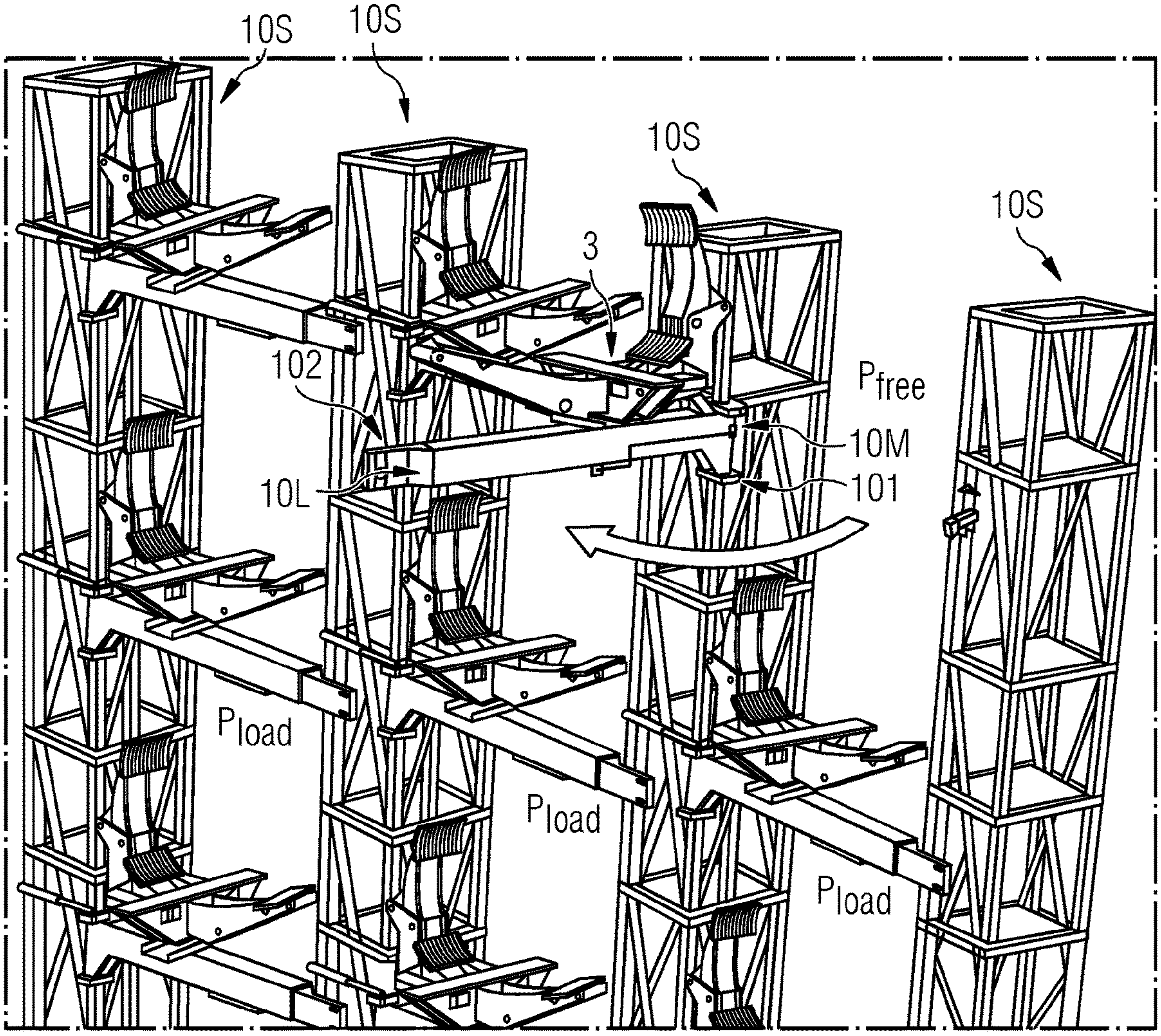
FIG. 3 illustrates loading stages using an embodiment of the inventive wind turbine rotor blade storage arrangement.

FIG. 2 shows a perspective view of an exemplary embodiment of the inventive airfoil rack arrangement TA. The diagram shows several upright support structures 10S arranged side by side at regular intervals. The diagram also shows several airfoil carrier brackets 10. In this exemplary realization, an airfoil clamp 3 is mounted to each bracket 10. In the upper right of the diagram, the direction of rotation of a bracket 10 is indicated when this bracket 10 will be moved from its loading position $P_{load}$ to its unloading position $P_{free}$. The bracket 10 is mounted at one end 101 to the upright support structures 10S by a pivot or swivel mount 10M. The swivel mount 10M comprises an actuator, for example, a remote-controlled hydraulic actuator such as a hydraulic power unit (HPU), that effects a quarter-turn of the bracket 10 as shown in FIG. 3. After rotating a bracket 10 to its unloading position $P_{free}$ as shown, access is given to the next lower level of the storage rack. FIG. 2 and FIG. 3 illustrate an embodiment in which the bracket 10 is realized as a sturdy beam, shaped to extend between two adjacent upright structures 10S. At one end 101, the swivel mount TOM connects the beam 10 to one upright structure 10S. At its other end 102, a locking means 10L is provided to allow the beam to lock onto the adjacent upright structure TOS when the bracket is in its loading position $P_{load}$.

Figure 4:
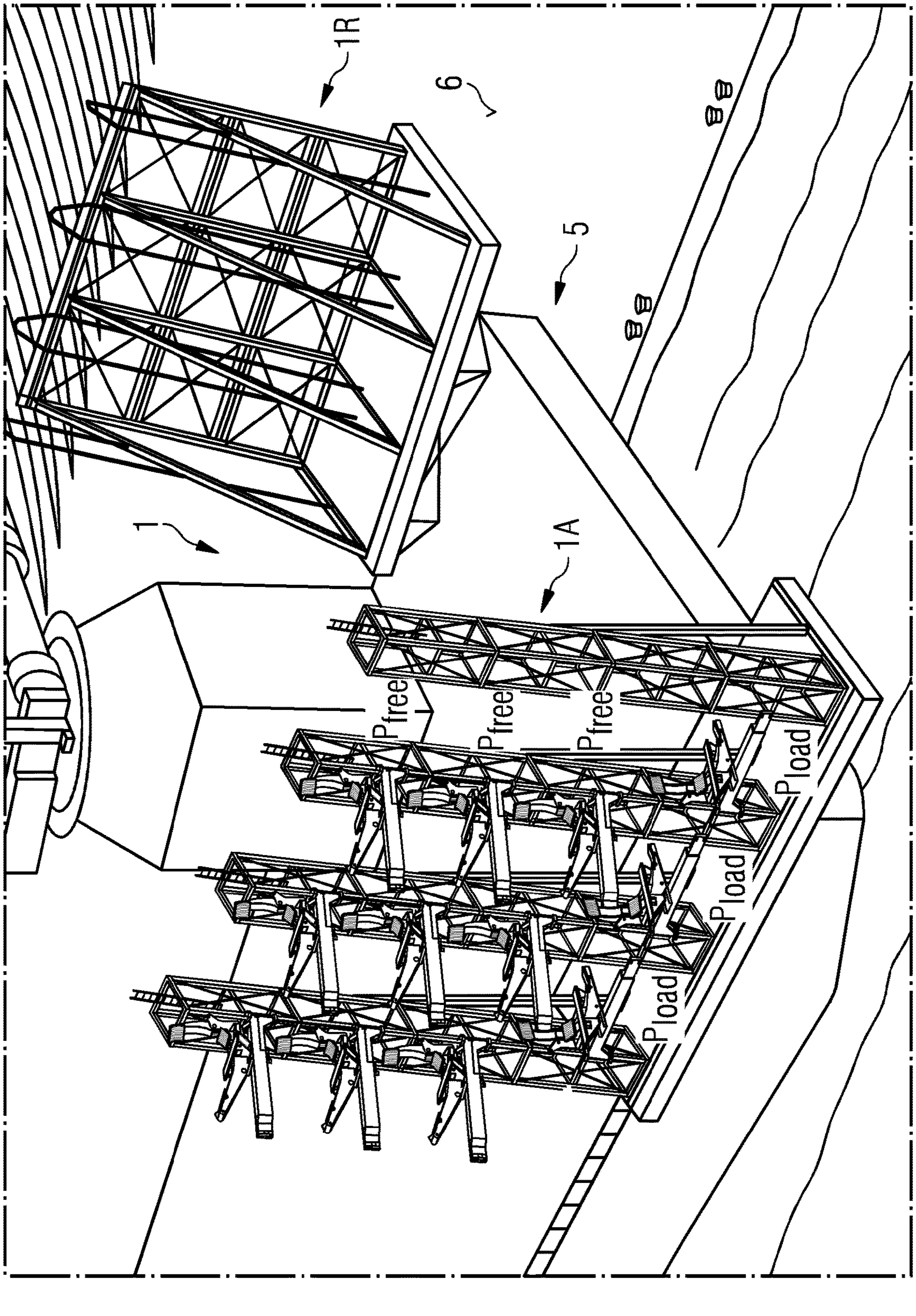
FIG. 4 illustrates loading stages using an embodiment of the inventive wind turbine rotor blade storage arrangement.

FIG. 4 illustrates an exemplary stage of the inventive method. Here, prior to loading the 3×4 rotor blade storage arrangement 1 with twelve rotor blades, nine brackets 10 have been moved to their "open" positions $P_{free}$, leaving the lowermost three brackets 10 in their "loading" or "ready" positions $P_{load}$ to receive rotor blades.

Figure 5:
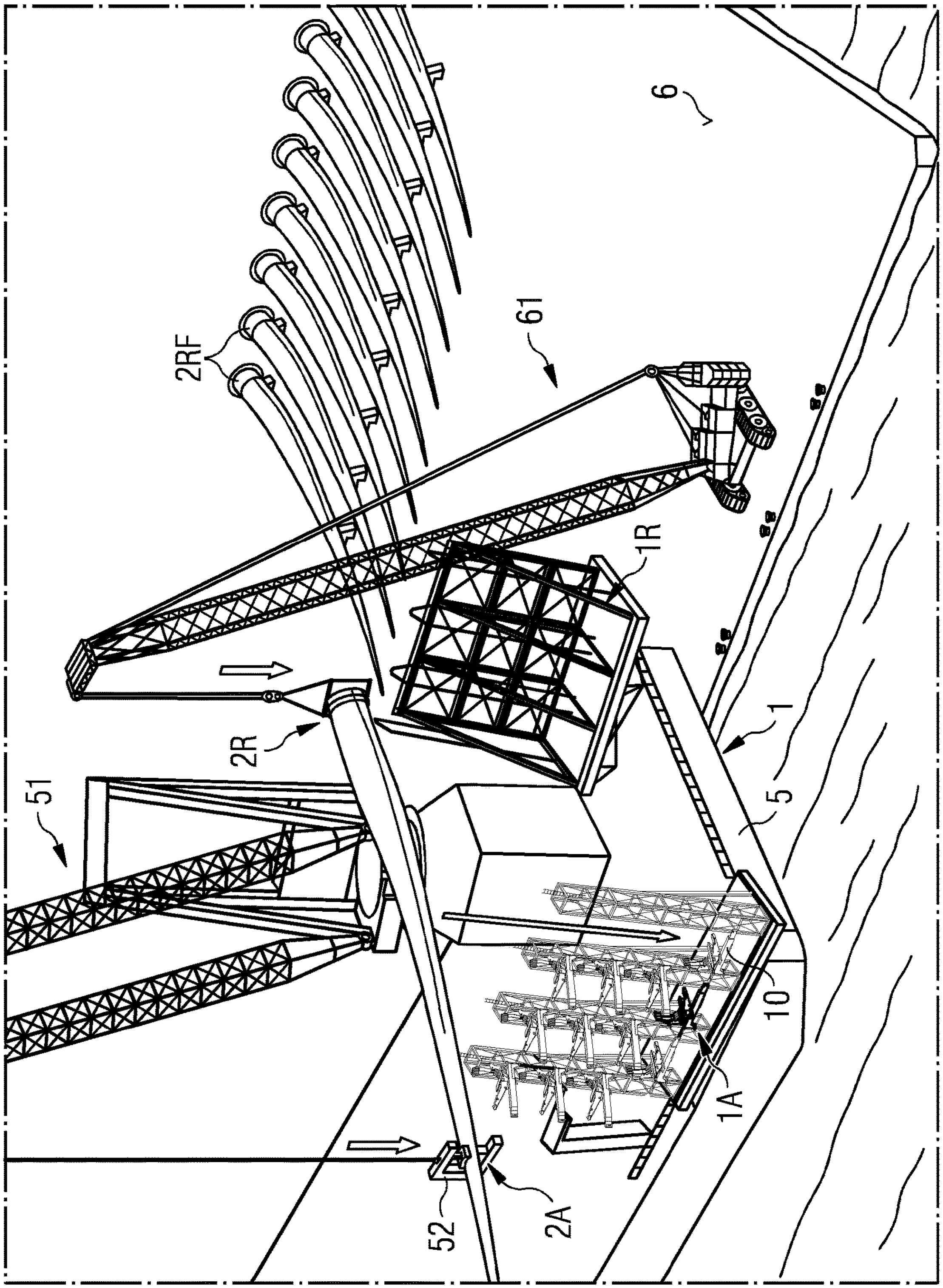
FIG. 5 illustrates loading stages using an embodiment of the inventive wind turbine rotor blade storage arrangement.

FIG. 5 shows a first rotor blade 2 being maneuvered into the storage arrangement 1. Two cranes 51, 61 are being controlled in a coordinated manner to hoist the rotor blade 2 from its parked position at the quay 6 into the air, into place above the storage racks 1A, 1R, and then downwards between the upright support structures 10S, 11S. As shown in the diagram, the upper three brackets 10 between the two right-hand uprights 10S are "open", so that the rotor blade can be safely lowered through this empty space as indicated by the vertical arrow, allowing the airfoil 2A to be placed into the open tip clamp 3 of the fourth and lowermost bracket 10. The rotor blade 2 is suspended from the crane 51 using a suitable remote-controlled hoisting clamp 52, from which the rotor blade will be released once it is in place on its airfoil bracket 10. Here, the hoisting clamp 52 is further outboard from the airfoil bracket 10 so that the airfoil 2A can be lowered into place into the waiting tip clamp 3.

At the same time, a root end fitting 2RF about the root end 2R engages with a corresponding fitting of the root end rack 1R. Once this rotor blade 2 has been placed into the rack arrangement 1, the third bracket 10 from the top is actuated to move it to its "loading" or "closed" position, in readiness to receive the next rotor blade 2.

Figure 6:
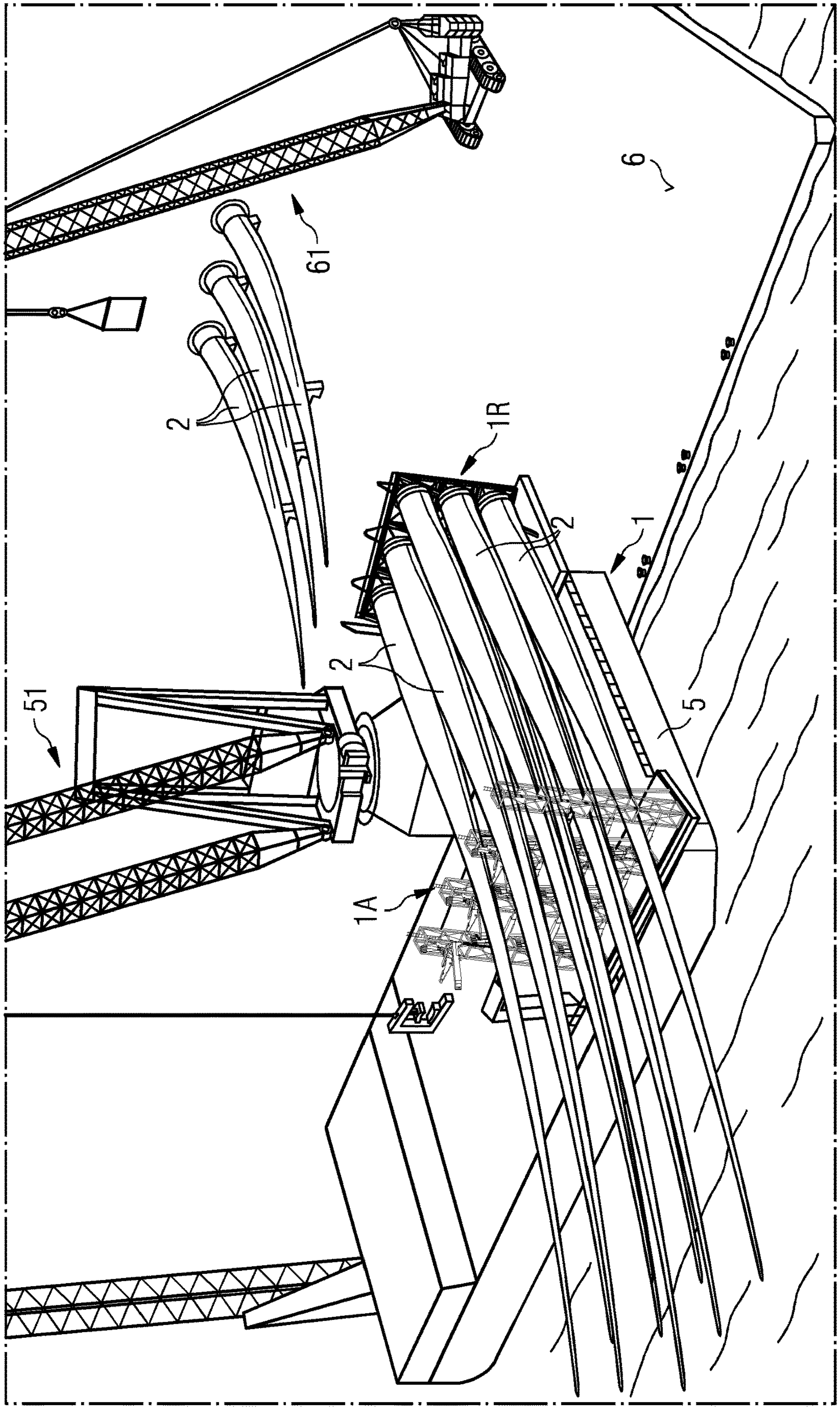
FIG. 6 illustrates loading stages using an embodiment of the inventive wind turbine rotor blade storage arrangement.

FIG. 6 shows an intermediate stage. Here, nine of the twelve rotor blades 2 have been loaded into the rack arrangement 1, and the last three rotor blades will now be maneuvered into place, one by one, thereby completing the loading procedure. At the destination site, the steps can be carried out in reverse order to unload the rotor blades.

In FIGS. 1-6, the racks 1A, 1R of the storage arrangement 1 are both tilted at an angle as explained above, primarily to allow the root ends 2R to be loaded in a "staggered" fashion. A horizontally-held rotor blade 2 can be maneuvered upwards or downwards in a straightforward motion without risk of its root end fitting colliding with the root end rack 1R.

The staggered root end rack 1R greatly speeds up the loading/unloading procedures. The airfoil rack TA is tilted at a similar angle, so that the airfoil 2A of each rotor blade 2 is clamped at the same position relative to the root end 2R.

Figure 7:
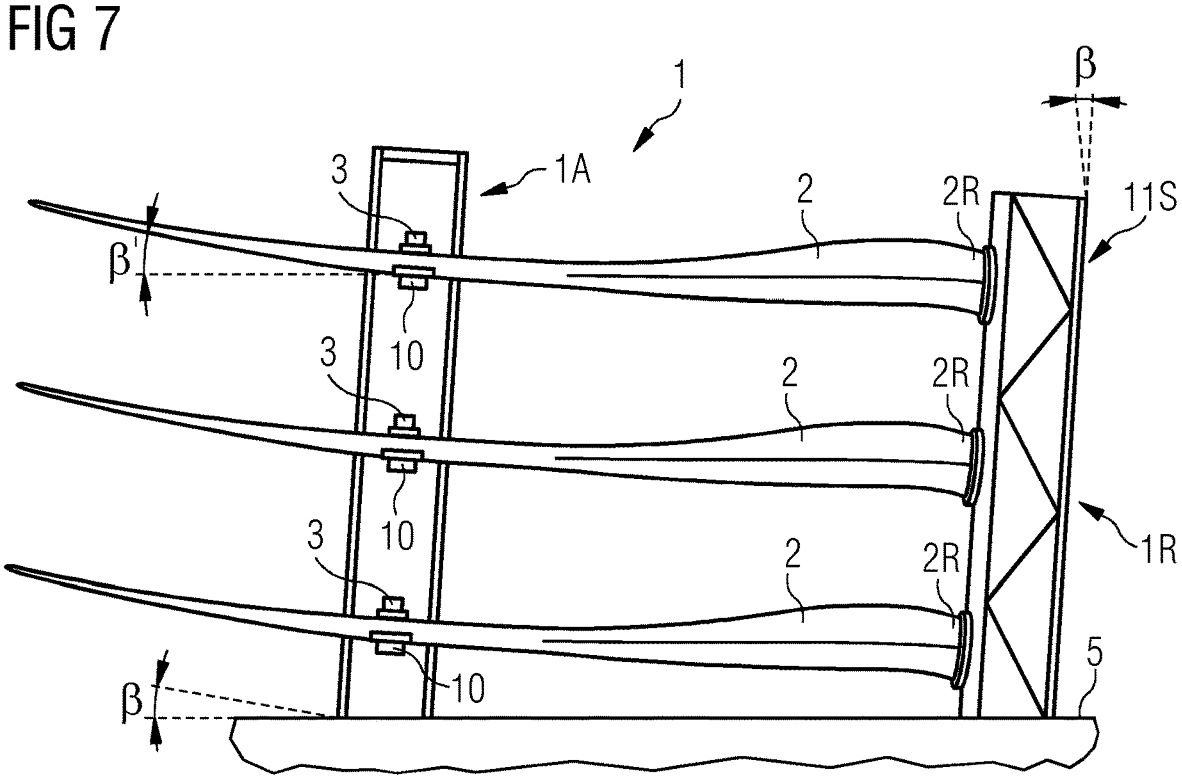
FIG. 7 is a partial side view of a further embodiment of the inventive wind turbine rotor blade storage arrangement.

The tilted racks 1A, 1R are shown in a side view in FIG. 7. The diagram shows that the upright supports 11S of the root rack arrangement 1R and the upright supports 10S of the airfoil rack arrangement TA are tilted with respect to the vertical by an angle β, which can be similar to the rotor blade pre-bend angle β'. In addition to helping avoid damage from collisions between root end fittings and the root end rack 1R, this "tilted" or "staggered" realization also favorably accommodates long, pre-bent rotor blades 2 as shown here, since the airfoil brackets 10, which are perpendicular to the uprights 10S, meet the rotor blade airfoil 1A at a suitable angle to receive the airfoil 2A. As explained above, a rotor blade pre-bend angle β' may be relatively small, in the order of 3°-4°, but may equally be relatively large, in the order of 10° or more.

Figure 8:
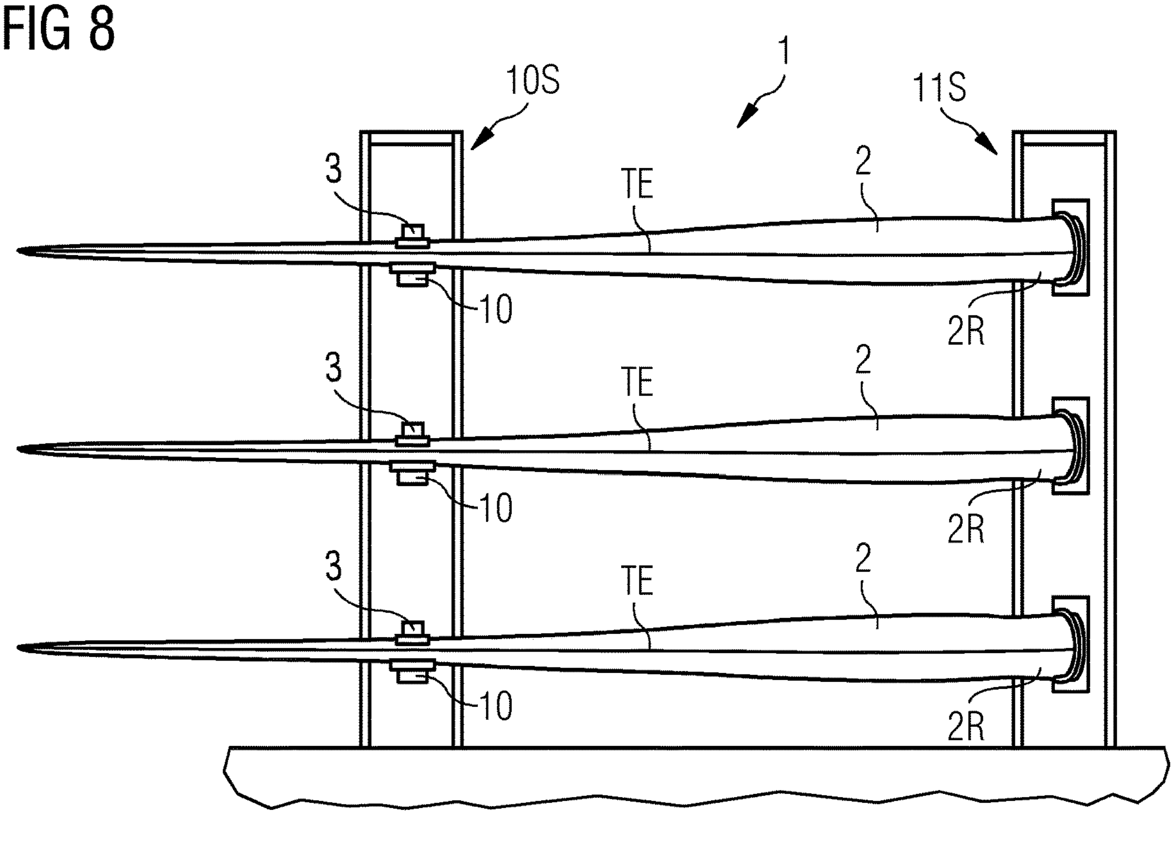
FIG. 8 is a partial side view of a further embodiment of the inventive wind turbine rotor blade storage arrangement.

FIG. 8 is a simplified schematic of an alternative exemplary embodiment. Here, the racks 1A, 1R are essentially vertical. Such a realization may be acceptable in the case of straight rotor blades 2 as shown here, although more care is required when maneuvering the root ends 2R relative to the root end rack 1R for the reasons given above. For example, when loading a rotor blade into the storage arrangement, it may be necessary to lower the rotor blade into position so that its root end has some clearance to the root end rack, before then moving the rotor blade laterally so that the root end fitting can engage with the root end rack. At the same time, care must be taken to avoid damage to the airfoil as it moves relative to its receiving bracket.

Figure 9:
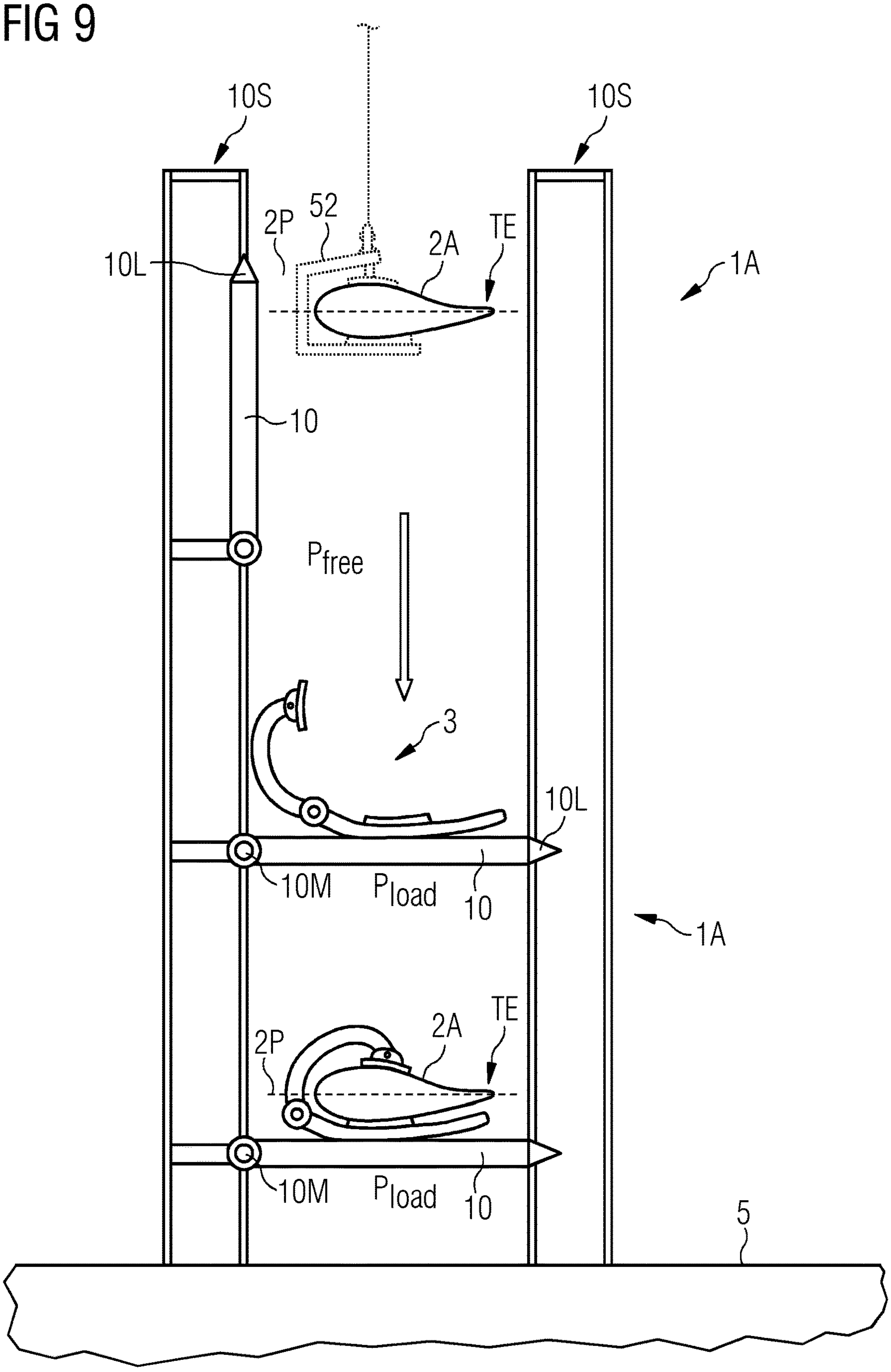
FIG. 9 shows a further embodiment of the inventive airfoil rack arrangement.

FIG. 9 shows a further possible realization of the airfoil rack arrangement 1A. Here, the brackets 10 are constructed to rotate essentially vertically through one quarter turn between their open position $P_{free}$ and loading position $P_{load}$. A suitable rotation means can be implemented at the interface between bracket 10 and upright 10S, for example a remote-controlled hydraulically operated barrel 10M mounted at the end of the bracket 10. A remote-controlled hook or other locking means 10L can be mounted at the outer end of the bracket 10 to affix the bracket 10 to the upright 10S when in its open position $P_{free}$. When a bracket 10 is in its open position as shown, a rotor blade 2 can be lowered into place through the empty space between uprights 10S, to an open tip clamp 3 as shown here. The rotor blade 2 is suspended from a crane as shown in FIG. 5 using a suitable remote-controlled hoisting clamp 52, from which the rotor blade will be released once it is in place on its airfoil bracket 10. This hoisting clamp 52 is either further inboard or further outboard from the airfoil bracket 10 as shown in FIG. 5, to allow the airfoil to be lowered into place into the open tip clamp 3 on the bracket 10. This diagram also illustrates the "horizontal" orientation of the rotor blade airfoil 2A, i.e., with an essentially horizontal chord plane.

FIG. 10 is a flowchart to illustrate a loading sequence using an embodiment of the inventive storage arrangement in which the airfoil rack arrangement and the root end rack arrangement are constructed to hold a two-dimensional array of wind turbine rotor blades. In a first step L0, all brackets are in the "open" position. In a subsequent step L1, a lowermost unloaded airfoil bracket is turned to its loading position. Then, in step L2, a wind turbine rotor blade is lowered between upright supports of the storage arrangement until the rotor blade airfoil is received by that airfoil bracket. Steps L1 and L2 are repeated until the storage arrangement is loaded with its array of rotor blades.

FIG. 11 is a flowchart to illustrate an unloading sequence using an embodiment of the inventive storage arrangement in which the airfoil rack arrangement and the root end rack arrangement are constructed to hold a two-dimensional array of wind turbine rotor blades. In a first step U1, the tip clamp of an uppermost rotor blade is opened, and the rotor blade is lifted from its bracket and removed from the storage arrangement. The term "uppermost rotor blade" is understood as any rotor blade whose path is not blocked by an airfoil bracket at a higher level. If that bracket is at the lowest level of the storage arrangement as checked in step U1.1, the method continues with step U1. Otherwise, the now unloaded carrier bracket is rotated in a subsequent step U2, the now unloaded airfoil carrier bracket is rotated to its "open" position to give access to the rotor blade at the next lower level. These steps are repeated until the rotor blades have all been unloaded from the storage arrangement.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An airfoil rack arrangement for supporting airfoils of a plurality of rotor blades, comprising:
- a number of upright support structures; and
- a number of airfoil carrier brackets, wherein an airfoil carrier bracket is constructed to extend outward from a support structure;
- wherein the airfoil carrier bracket is rotatably mounted to the support structure and configured to rotate between
  - a loading position in which the airfoil carrier bracket is positioned to support an airfoil of a rotor blade, and
  - an unloading position in which the airfoil carrier bracket is out of the path of a rotor blade being lifted vertically;
- wherein an outer end of the airfoil carrier bracket further comprises a locking means configured to engage with an adjacent support structure.

2. The airfoil rack arrangement according to claim 1, wherein the unloading position of the airfoil carrier bracket is essentially perpendicular to its loading position.

3. The airfoil rack arrangement according to claim 1, wherein the airfoil carrier bracket is constructed to rotate in an essentially horizontal plane between its unloading position and its loading position.

4. The airfoil rack arrangement according to claim 1, wherein the airfoil carrier bracket further comprises a beam, and wherein one end of the beam is rotatably mounted to the support structure.

5. The airfoil rack arrangement according to claim 1, wherein the airfoil carrier bracket is mounted to the support structure by a swivel mount.

6. The airfoil rack arrangement according to claim 1, wherein the airfoil carrier bracket further comprises an airfoil clamp to receive the airfoil of the rotor blade.

7. The airfoil rack arrangement according to claim 6, wherein the airfoil clamp is shaped to receive the rotor blade oriented with its chord plane essentially horizontal.

8. The airfoil rack arrangement according to claim 1, wherein the airfoil rack arrangement subtends an angle relative to the vertical, which angle corresponds to a pre-bend angle of a wind turbine rotor blade.

9. A wind turbine rotor blade storage arrangement comprising:

an airfoil rack arrangement having an upright support structure and an airfoil carrier bracket, wherein the airfoil carrier bracket is constructed to extend outward from the support structure, wherein the airfoil carrier bracket is rotatably mounted to the support structure and configured to rotate between a loading position in which the airfoil carrier bracket is positioned to support an airfoil of a rotor blade and an unloading position in which the airfoil carrier bracket is out of the path of the rotor blade being lifted vertically, wherein an outer end of the airfoil carrier bracket further comprises a locking means configured to engage with an adjacent support structure; and a root end rack arrangement for supporting a root end of the rotor blade.

10. The wind turbine rotor blade storage arrangement according to claim 9, further comprising a hydraulic actuator, wherein the hydraulic actuator effects movement of the airfoil carrier bracket between its loading position and its unloading position.

11. The wind turbine rotor blade storage arrangement according to claim 9, further comprising a control means for remote control of the hydraulic actuators.

12. The wind turbine rotor blade storage arrangement according to claim 9, wherein the airfoil rack arrangement and/or the root end rack arrangement subtend an angle relative to the vertical, which angle corresponds to a pre-bend angle of a wind turbine rotor blade.

13. The wind turbine rotor blade storage arrangement according to claim 9, wherein the airfoil rack arrangement and/or the root end rack arrangement are constructed to support a two-dimensional array of wind turbine rotor blades.

14. A method of handling wind turbine rotor blades using the wind turbine rotor blade storage arrangement according to claim 9, wherein the wind turbine rotor blade storage arrangement is configured to receive a vertical stack of rotor blades, the method comprising:

L0) rotating an airfoil carrier bracket to the unloading position;

L1) rotating a lowermost free airfoil carrier bracket to its loading position;

L2) lowering a wind turbine rotor blade between upright supports of the wind turbine rotor blade storage arrangement until the airfoil of the rotor blade is received by the lowermost free airfoil carrier bracket; and repeating steps L1 and L2 until the wind turbine rotor blade storage arrangement is loaded with wind turbine rotor blades.

15. The method according to claim 14, further comprising:

U1) lifting any uppermost wind turbine rotor blade from its airfoil carrier bracket; and U2) rotating that unloaded airfoil carrier bracket to its unloading position; and repeating steps U1 and U2 until the wind turbine rotor blades have been removed from the storage arrangement.

* * * * *